(12) United States Patent
Hager et al.

(10) Patent No.: US 6,744,397 B1
(45) Date of Patent: Jun. 1, 2004

(54) SYSTEMS AND METHODS FOR TARGET LOCATION

(75) Inventors: James R. Hager, Golden Valley, MN (US); Larry D. Almsted, Bloomington, MN (US); Thomas Jicha, Elk River, MN (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/458,950

(22) Filed: Jun. 11, 2003

(51) Int. Cl.[7] .............................................. G01S 13/06
(52) U.S. Cl. ........................ 342/55; 342/56; 342/120; 342/122; 342/139; 342/146; 342/147
(58) Field of Search ............................ 342/52, 53, 54, 342/55, 56, 58, 120, 121, 122, 139, 146, 147

(56) References Cited

U.S. PATENT DOCUMENTS

| | | | | |
|---|---|---|---|---|
| 4,700,307 A | * | 10/1987 | Mons et al. | 701/220 |
| 4,829,304 A | * | 5/1989 | Baird | 342/63 |
| 4,939,663 A | * | 7/1990 | Baird | 701/208 |
| 5,272,639 A | * | 12/1993 | McGuffin | 701/207 |
| 5,335,181 A | * | 8/1994 | McGuffin | 701/200 |
| 5,341,142 A | | 8/1994 | Reis et al. | 342/64 |
| 5,672,820 A | | 9/1997 | Rossi et al. | 73/178 R |
| 5,883,586 A | | 3/1999 | Tran et al. | 340/945 |
| 5,892,462 A | * | 4/1999 | Tran | 340/961 |
| 5,969,676 A | | 10/1999 | Tran et al. | 342/442 |
| 6,232,922 B1 | | 5/2001 | McIntosh | 701/208 |
| 6,233,522 B1 | | 5/2001 | Morici | 342/453 |
| 6,362,776 B1 | | 3/2002 | Hager et al. | 342/121 |
| 6,639,545 B1 | * | 10/2003 | Hager et al. | 342/107 |
| 2002/0188386 A1 | * | 12/2002 | Day | 701/4 |
| 2003/0210180 A1 | * | 11/2003 | Hager et al. | 342/165 |
| 2003/0210181 A1 | * | 11/2003 | Hager et al. | 342/165 |

OTHER PUBLICATIONS

"Digital terrain systems", Fountain, J.R.;Airborne Navigation Systems Workshop (Digest No. 1997/169), Feb. 21, 1997 pp.:4/1–4/6.*

"Advanced terrain data processor", Raymer, K.; Weingartner, T.;Digital Avionics Systems Conference, 1994. 13th DASC., AIAA/IEEE, Oct. 30–Nov. 3, 1994 pp.:636–639.*

"Heli/SITAN: a terrain referenced navigation algorithm for helicopters", Hollowell, J.; Position Location and Navigation Symposium, 1990. Record. 'The 1990's—A Decade of Excellence in the Navigation Sciences'. IEEE PLANS '90, Mar. 20–23, 1990 Ps:616–625.*

* cited by examiner

Primary Examiner—John B. Sotomayor
(74) Attorney, Agent, or Firm—Matthew Luxton, Esq.; Armstrong Teasdale LLP

(57) ABSTRACT

A method of determining a target location from a vehicle is described. The method includes identifying the target utilizing a video system, determining an angular location vector to the target with respect to the vehicle, determining a position of the vehicle utilizing a digital terrain elevation map and precision radar altimeter, calculating a location where the angular location vector would intersect with the digital terrain elevation map, and generating a target position based on vehicle position and the location of the intersection of the angular location vector and digital terrain elevation map.

18 Claims, 4 Drawing Sheets

SYSTEMS AND METHODS FOR TARGET LOCATION

BACKGROUND OF THE INVENTION

This invention relates generally to location of a target, and more specifically, to locating target positions utilizing a radar altimeter with terrain feature coordinate location capability.

Target location, in terms of latitude, longitude, and a vertical reference (e.g. elevation), is utilized for all types of targeting processes. Presently utilized target location methodologies include, for example, personnel using visual target location equipment or GPS locators. Using personnel to locate targets with visual locating devices can be dangerous and often times extremely difficult due to terrain ruggedness. Further, the accuracy of the target location is highly dependent on the abilities and skill of the personnel performing the target location. In addition, Global Positioning Satellite (GPS) locating devices are extremely susceptible to jamming.

Radar altimeters are not as easily jammed as GPS devices. One known precision radar altimeter "looks" at the ground in a series of narrow doppler swaths, using doppler band pass filters to focus in on one swath at a time. Return signals are received by two or more antennas. The location of the highest point within a particular swath is determined by performing phase comparisons of the return signals received by the two antennas and passed through the particular doppler band pass filter. If the highest point being illuminated by radar is directly below the air vehicle, then the return signal is received by both antennas at the same time. On the other hand, if the highest point is off to one side of the air vehicle, the return signal will be received by one antenna before it is received by the second antenna, because the return path to the second antenna is longer then the return path to the first antenna.

The phase or the time of arrival of the return signals at each of the antennas are compared. The radar altimeter described above can be utilized with digital terrain elevation maps which provide stored latitude, longitude, and elevation data for a given area or terrain.

BRIEF SUMMARY OF THE INVENTION

In one aspect, a method of determining a target location from a vehicle is provided. The method comprises identifying the target utilizing a video system, determining an angular location vector to the target with respect to the vehicle, and determining a position of the vehicle on a digital terrain elevation map with the precision radar altimeter. A location where the angular location vector would intersect with the digital terrain elevation map is calculated and a target position is generated based on vehicle position and the location of the intersection of the angular location vector and digital terrain elevation map.

In another aspect, a target location system for use in a vehicle is provided. The system comprises a telemetry transmitter/receiver communicatively coupled to both a radar altimeter and a video system. The video system identifies targets and provides an angular position of the target to the telemetry transmitter/receiver. The radar altimeter determines a position of the vehicle utilizing digital terrain elevation maps and provides the position of the vehicle to the telemetry transmitter/receiver. The target location system determines a position of the target utilizing the angular location vector, the vehicle position, and a digital terrain elevation map for a vicinity of the target.

DETAILED DESCRIPTION OF THE INVENTION

Figure 1:
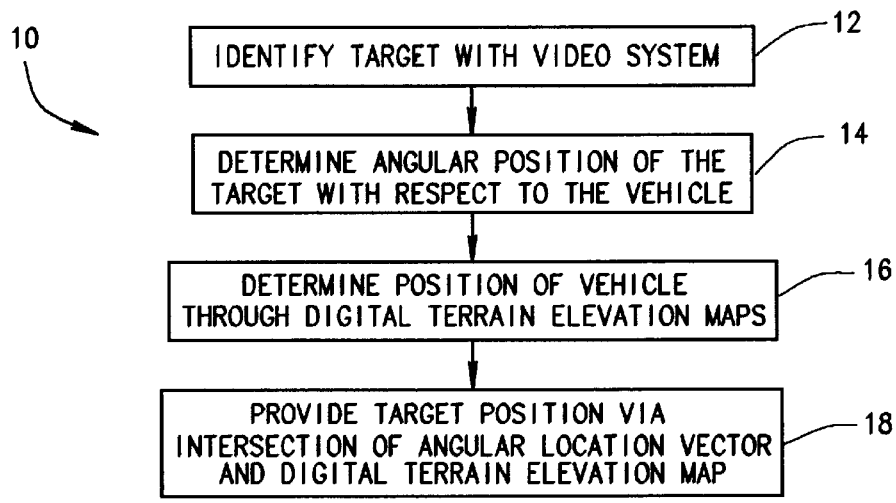
FIG. 1 is a flowchart which shows one method of determining target location.

FIG. 1 is a flowchart 10 which illustrating one method of determining a target location relative to a vehicle. The method includes identifying 12 the target utilizing a video system, determining 14 an angular location vector to the target with respect to the vehicle, determining 16 a position of the vehicle on a digital terrain elevation map, and providing 18 the target position by intersecting the angular location vector with digital terrain elevation map data. In one embodiment, determining 16 a position of the vehicle includes determining a latitude, longitude and elevation of the vehicle. In another embodiment, determining 16 a position of the vehicle includes utilizing a radar altimeter, which works in conjunction with the digital terrain elevation map to determine a vehicle position.

As described below, the radar altimeter receives the angular location vector in vehicle body coordinates, and converts the location of the target to local coordinates of the target, for example, a latitude, a longitude, and an elevation of the target.

Figure 2:
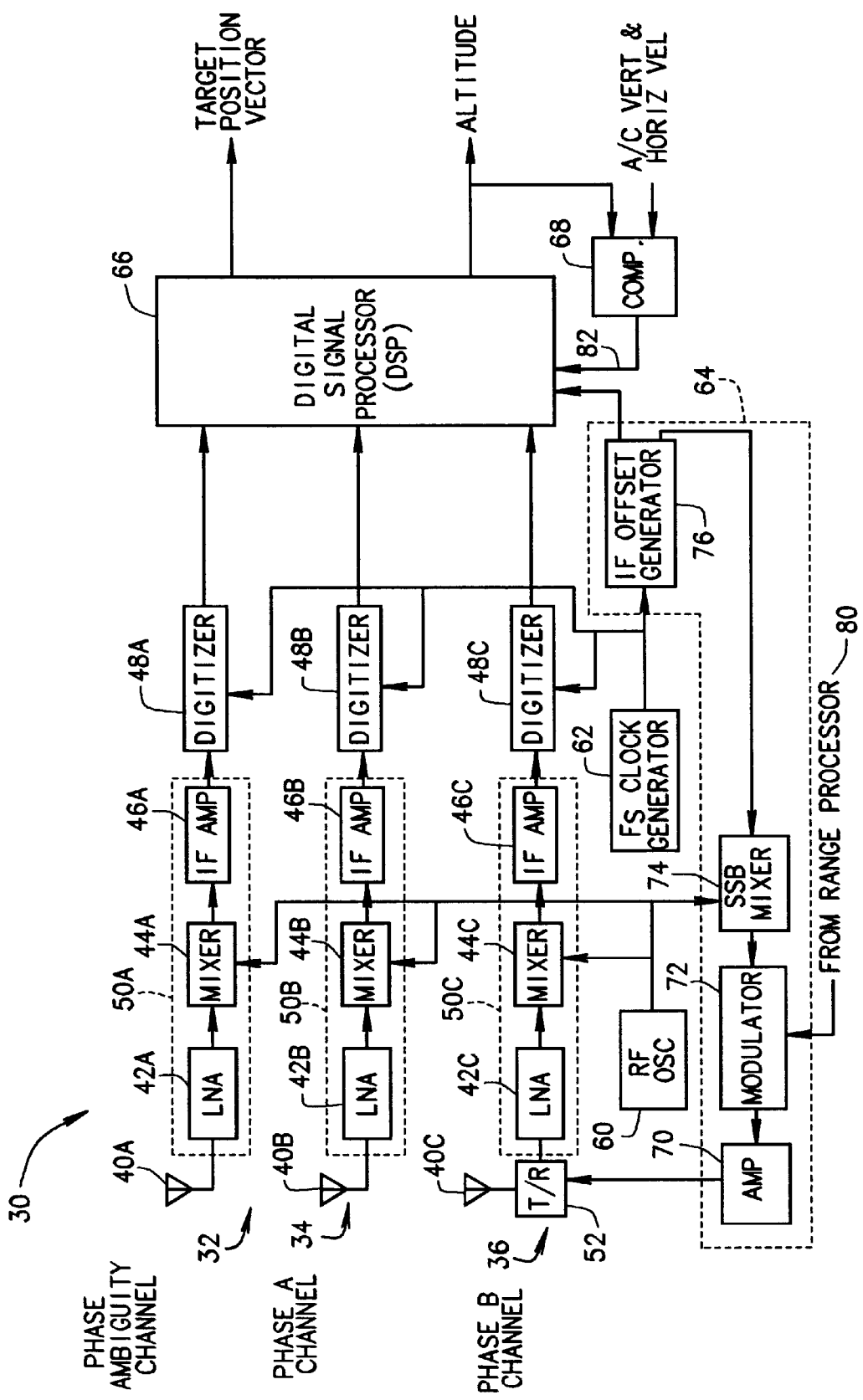
FIG. 2 is a block diagram of a radar altimeter.

FIG. 2 is a block diagram of a radar altimeter 30. In a preferred embodiment, radar altimeter 30 is incorporated in an air vehicle. Radar altimeter 30 includes three channels—phase ambiguity channel 32, phase A channel 34 and phase B channel 36. Channel 32 includes antenna 40A, low noise amplifier (LNA) 42A, mixer 44A, intermediate frequency (IF) amplifier 46A, and digitizer 48A. Low noise amplifier (LNA) 42A, mixer 44A, intermediate frequency (IF) amplifier 46A form receiver 50A. Channel 34 includes antenna 40B, LNA 42B, mixer 44B, IF amplifier 46B, and digitizer 48 B. LNA 42B, mixer 44B, and IF amplifier 46B form receiver 50B. Channel 36 includes antenna 40C, transmit/receive switch 52, LNA 42C, mixer 44C, IF amplifier 46C and digitizer 48C. LNA 42C, mixer 44C, and IF amplifier 46C form receiver 50C. Transmit/receive switch 52 in channel 36 allows channel 36 antenna 40c to operate in either a transmit mode or a receive mode.

Radar altimeter 30 further includes RF oscillator 60, clock generator 62, transmitter 64, digital signal processor (DSP) 66 and computer 68. Transmitter 64 includes power amplifier 70, modulator 72, single side band (SSB) mixer 74 and intermediate frequency (IF) offset generator 76. RF oscillator 60 is coupled to mixers 44A–44C and SSB mixer 74. Clock generator 62 is coupled to digitizers 48A–48C and IF offset generator 76.

Radar altimeter 30 provides cross-track and vertical distance to the highest object below the air vehicle in, for example, ten foot wide down-track swaths, which are bounded by an antenna pattern. The term "down-track", as used herein, means in a direction of travel, and the term "cross-track", as used herein, means perpendicular to the direction of travel. Other antenna patterns and swath characteristics may be utilized.

Radar altimeter 30 is utilized to transmit a radar signal toward the ground. To generate the radar signal, clock generator 62 provides a clock signal to IF offset generator 76, for example, 120 MHz. IF offset generator 76 generates an offset signal for the radar transmission signal. Continuing the example, offset generator 76 divides the input clock signal from clock generator 62 by four, and outputs a clock signal at 30 MHz. SSB mixer 74 mixes the 30 MHz clock-signal from IF offset generator 76 with an RF signal from RF oscillator 60, resulting in a 30 MHz offset of the RF signal. SSB mixer 74 outputs the offset signal to modulator 72. In the example, RF oscillator 20 operates at about 4.3 GHz. Modulator 72 receives transmit code data from a range processor 80, and pulse modulates and phase modulates the signal received from SSB mixer 74 and outputs the modulated signal to power amplifier 70. Power amplifier 70 amplifies the received signal and outputs the amplified signal to antenna 40C through transmit/receive switch 52. Antenna 40C transmits the modulated signal towards the ground. In an example, transmitter 64 transmits approximately 600 pulses in intervals of 12 milliseconds, with a pulse separation of about 20 microseconds. Other frequencies and pulse separations may be used.

After a radar signal is transmitted by channel 36, the signal reflected from the ground is received by antennas 40A–40C and is processed by the components of each of channels 32, 34, and 36. LNA 42C, mixer 44C, IF amplifier 46C, and digitizer 48C in channel 36 are the same as the corresponding components in channels 32 and 34, so each channel 32, 34, and 36 performs the same functions as the other channels. Therefore functions will be described with respect to channel 36, with the understanding that channels 32 and 34 operate in the same manner in receiving and processing signals.

A return signal received by antenna 40C passes through transmit/receive switch 52 and is amplified by LNA 42C. Mixer 44C mixes the amplified return signal with the RF oscillator signal output by RF oscillator 60, and outputs an IF offset signal to IF amplifier 46C. The IF offset signal is amplified by IF amplifier 46C and output to digitizer 48C. Digitizer 48C digitizes the received signal and outputs the digitized signal to DSP 66. The frequency of clock generator 62 determines the rate that the incoming analog signals on channels 32,34, and 36 are sampled and digitized by digitizers 48A–48C.

Computer 68 receives air vehicle or aircraft (A/C) vertical and horizontal velocity data from the air vehicle's inertial navigation system (INS) (not shown). Computer 68 processes the velocity data and outputs doppler swath filter control signals to DSP 66 on control lines 82. DSP 66 outputs target position vectors identifying the position of the highest point within particular regions or "swaths" on the ground, and also outputs above ground level (AGL) altitude data that identifies the vehicle altitude.

Figure 3:
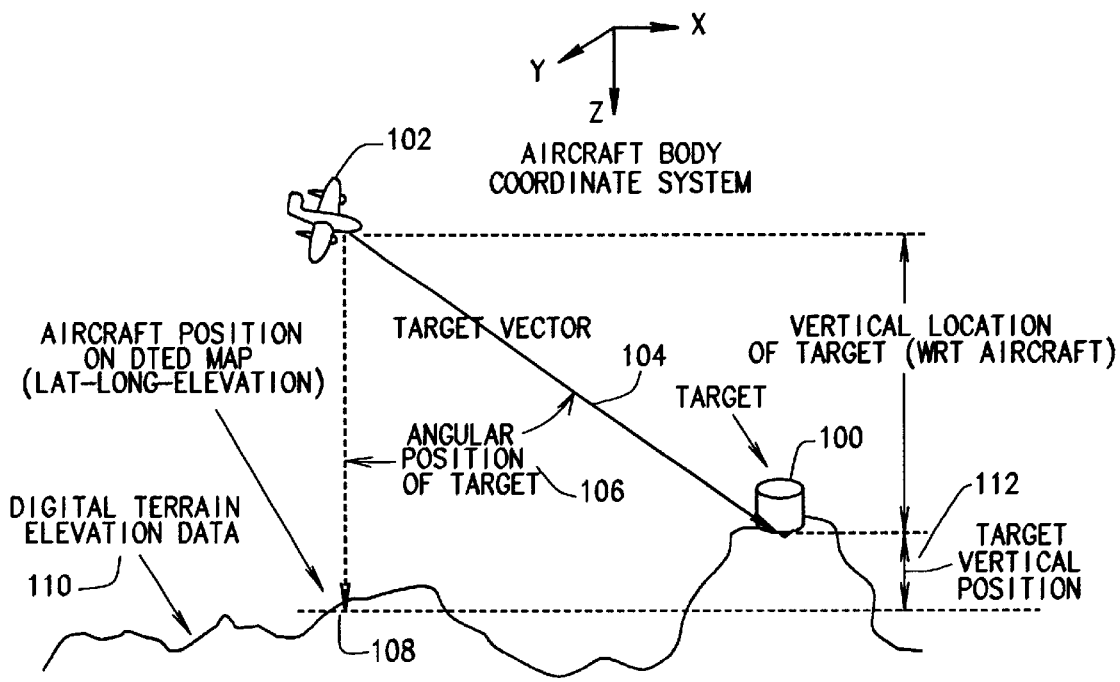
FIG. 3 illustrates target location from a vehicle.

FIG. 3 illustrates location of a target 100 from a vehicle 102. In one embodiment, target 100 is identified by a video system (shown in FIG. 4) within vehicle 102, and a target vector 104, based on an azimuth pointing angle and an elevation angle of the video system is generated. Based on target vector 104, an angular position 106 of target 100 is determined, in vehicle body coordinates, with respect to vehicle 102. Radar altimeter 30 (shown in FIG. 2), which receives target vector 104, converts the vehicle body coordinates to coordinates based on a line of flight of vehicle 102. Coordinates based on a line of flight are sometimes referred to as local coordinates or doppler coordinates, and are described below with respect to FIGS. 5 and 6. Radar altimeter 30 then determines vehicle position 108, in one embodiment, in latitude, longitude, and elevation, based on digital terrain elevation map data 110 stored in vehicle 102. Based on vehicle position 108, position of target 100 in vehicle body coordinates (converted to doppler coordinates), and digital terrain elevation map data for a vicinity of target 100, an actual position of target 100 in latitude, longitude, and elevation 112 is determined.

Figure 4:
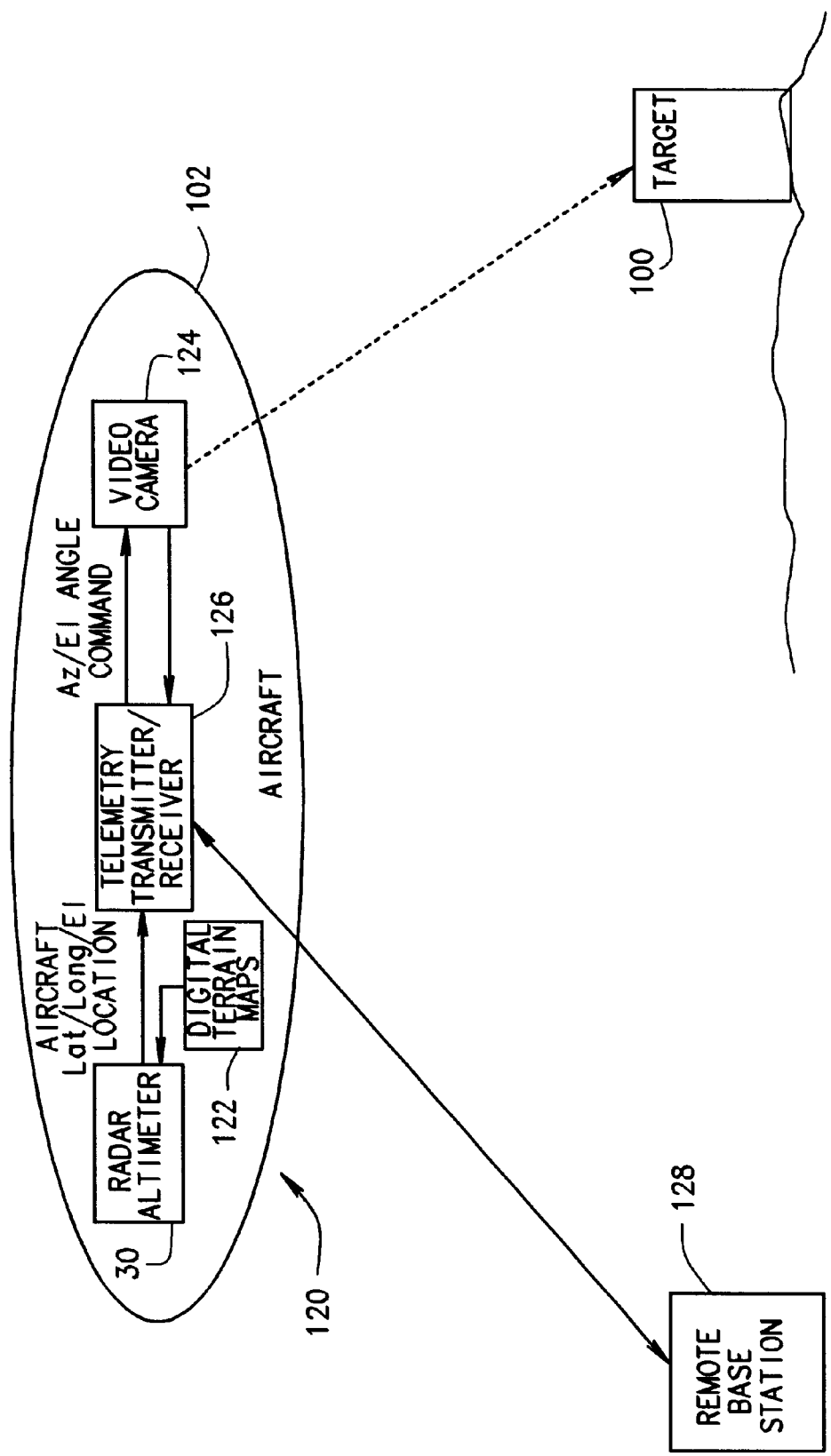
FIG. 4 is a block diagram illustrating a video system and radar altimeter.

FIG. 4 is a block diagram illustrating a hybrid video/radar altimeter system 120 which provides the above described target location method. System 120 includes radar altimeter 30 (also shown in FIG. 2) which receives digital terrain elevation map data 122. A video system 124 is used to identify targets 100. System 120 further includes a telemetry transmitter/receiver 126 which receives data from radar altimeter 30, video system 124 and a remote base station 128. In one embodiment, radar altimeter 30 is a precision terrain aided navigation (PTAN) radar system. Hybrid system 120 is installed on a vehicle 102, for example, a manned or unmanned aircraft. Target 100 is identified by video system 124 and an angular location of target 100 is determined with respect to vehicle 102 by remote base station 128 from data received from telemetry transmitter/receiver 126 and a digital terrain elevation map stored in remote base station 128 which is similar to digital terrain elevation 122.

Radar altimeter 30 determines a position of vehicle 102, for example, described in terms of latitude, longitude, and elevation, based upon incorporation of data from precision digital terrain elevation maps 122. A location of vehicle 102 in latitude, longitude, and elevation, the angular location of target 100 with respect to the aircraft as provided by telemetry transmitter/receiver 126, and terrain elevation data in the vicinity of target 100, allows system 120 to determine a location of target 100 in latitude, longitude, and elevation.

Specifically, and in one embodiment, video system 124, sometimes referred to as a video target recognition system, identifies a target 100. A precision angular position, a three dimensional position in vehicle body coordinates, is determined based on a direction of a camera which is a part of video system 124. As the line of flight of vehicle 102 is typically not aligned with vehicle body coordinates, the measured target vector angle (angular position) in body coordinates is then converted into a vector based on local (doppler) coordinates. Radar altimeter 30 determines a position of vehicle 102 on precision digital terrain elevation maps 122. An intersection of the target vector in local coordinates with terrain in the vicinity of target 100 on precision digital terrain elevation map 122 allows latitude, longitude, and elevation coordinates of target 100 to be determined.

In one embodiment, telemetry transmitter/receiver 126 is a communications link between aircraft 102 (e.g. an unmanned drone) and remote base station 128. In the embodiment, as aircraft 102 flies along a flight path video system 124 is utilized to acquire targets 100. An operator at remote base station 128 is able to control a field of view (FOV) of video system 124. On seeing a possible point of interest (e.g. target 100), the operator zooms in and adjusts a pointing azimuth angle and an elevation angle of video system 124 (through telemetry transmitter/receiver 126) to keep the acquired target 100 within the narrowing FOV of video system 124, providing a controlled angle. The controlled angle includes the angles which provide a location of target 100 with respect to aircraft 102.

During this acquisition period, radar altimeter 30 is also providing a position of aircraft 102, based on digital terrain elevation map 122 to remote base station 128 utilizing telemetry transmitter/receiver 126. Remote base station 128 locates aircraft 102, utilizing its own digital terrain elevation map. Since remote base station 128 also has received the pointing angles of video system 124 from telemetry transmitter/receiver 126, base station 128 has stored all data necessary to geometrically locate a latitude, longitude, and elevation of target 100.

Figure 5:
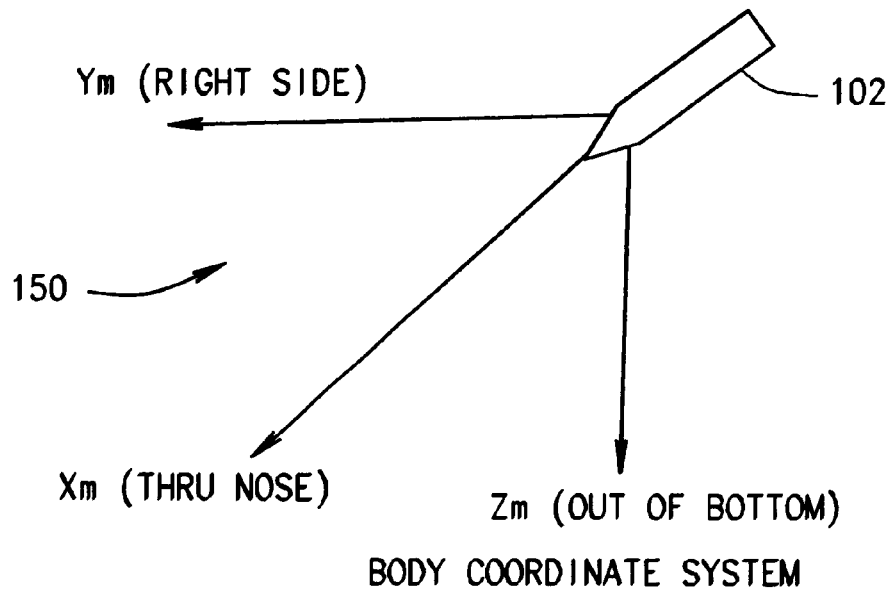
FIG. 5 illustrates a body coordinate system.
Figure 6:
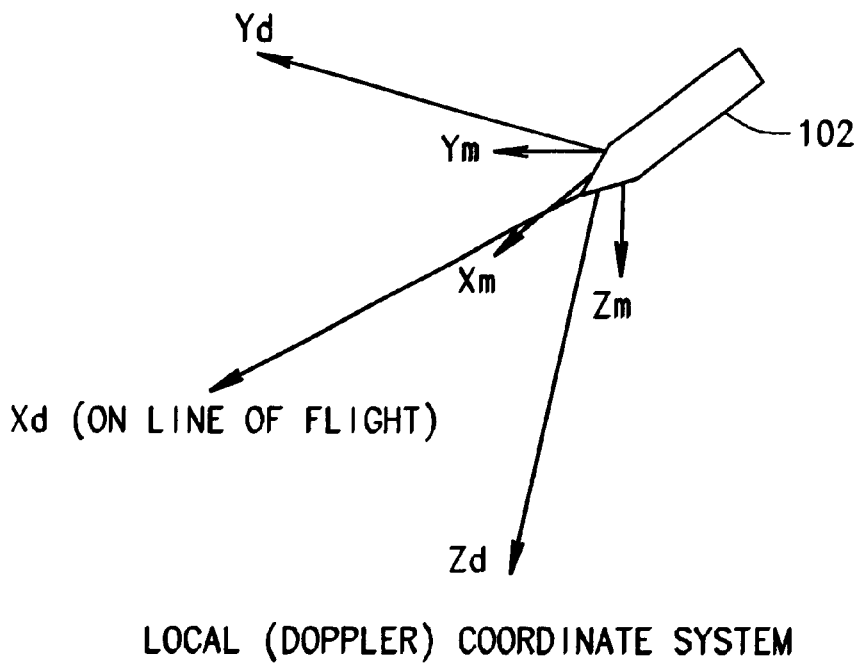
FIG. 6 illustrates a local coordinate system with respect to the body coordinate system.

FIGS. 5 and 6 illustrate conversion of an angular position of target 100 in vehicle body coordinates to a local (doppler) coordinate vector. FIG. 5 illustrates a body coordinate system 150. The body coordinate system, is the coordinate system with respect to the body of vehicle 102. An x-axis, Xm is an axis which passes through a nose of the body of vehicle 102. A y-axis, Ym, is an axis which is 90 degrees from Xm and is positive to the right of the body of vehicle 102. A z-axis, Zm, is an axis which is 90 degrees from both Xm and Ym and perpendicular to a bottom of the body of vehicle 102. With respect to vehicle maneuvering, a positive roll is a drop of the right wing, a positive pitch is a nose up, and a positive yaw is the nose to the right, all with respect to a line of flight.

It is known that air vehicles, for example, vehicle 102, do not typically fly in alignment with their body coordinates. Such a flight path is sometimes referred to as a line of flight. Therefore an aircraft which is flying with one or more of a pitch, roll, or yaw, and which has a hard mounted radar system, for example, radar altimeter 30, (shown In FIG. 2) introduces an error element in a determination of target location, in body coordinates. As such radars typically operate with respect to the line of flight, a coordinate system with respect to the line of flight has been developed and is sometimes referred to as a local coordinates or as a doppler coordinate system. FIG. 6 illustrates differences between vehicle body coordinates and local coordinates. An x-axis of the local coordinate system, Xd, is on the line of flight of vehicle. A y-axis, Yd, and a z-axis, Zd, at right angles to Xd, respectively are defined as across Xd, and above and below Xd.

Therefore, if vehicle 102 is flying with no pitch, roll, or yaw, the body coordinate system aligns with the local coordinate system. For a positive roll, Xm and Xd are still aligned, while Yd rotates below Ym and Zd rotates to the left of Zm. For a positive yaw, Xd rotates to the right of Xm, Yd rotates behind Ym, and Zd and Zm are aligned. For a positive pitch, Xd rotates above Xm, Yd aligns with Ym, and Zd rotates ahead of Zm.

The effects of having multiple of pitch, roll, and yaw, and a determination of a target position in vehicle body coordinates is apparent. The above described systems and methods provide target location capabilities based on an actual location of a vehicle, and its line of flight. Determination of the actual position of a target in latitude, longitude, and elevation, which removes any errors generated by having a vehicle not aligned with its line of flight. Such position determination has advantages which are also apparent, as the relationship between body coordinates and local coordinates are almost certainly in a constantly changing relationship, whereas latitudinal, longitudinal, and elevation position of a target is typically a constant. Having latitudinal, longitudinal, and elevation positions of targets provides greater certainty when any type of action (i.e. missile strike, landing, identification of target contents) involving the target is contemplated.

In addition, no GPS system is required to provide a position of a target. The combination of radar altimeter 30 and video system 124, along with the communications link of telemetry transmitter/receiver 126 and remote base station 128 reduces or eliminates reliance on GPS systems, which as described above, is susceptible to jamming.

While the invention has been described in terms of various specific embodiments, those skilled in the art will recognize that the invention can be practiced with modification within the spirit and scope of the claims.

What is claimed is:

1. A method of determining a target location from a vehicle, said method comprising:

identifying the target utilizing a video system;

determining an angular location vector to the target with respect to the vehicle;

determining a position of the vehicle utilizing a digital terrain elevation map;

calculating a location where the angular location vector would intersect with the digital terrain elevation map; and generating a target position based on vehicle position and the location of the intersection of the angular location vector and digital terrain elevation map.

2. A method according to claim 1 wherein determining a position of the vehicle comprises determining a latitude, longitude and elevation of the vehicle.

3. A method according to claim 1 wherein determining a position of the vehicle comprises determining a position of the vehicle utilizing a radar altimeter and the digital terrain elevation map.

4. A method according to claim 1 wherein determining an angular location vector to the target comprises determining an angular location vector to the target in vehicle body coordinates.

5. A method according to claim 4 further comprising converting the angular location vector to local coordinates.

6. A method according to claim 1 further comprising transmitting the angular location vector and the position of the vehicle to a remote base station, the base station including a digital terrain elevation map.

7. A method according to claim 6 wherein providing a target position comprises transmitting the target position from the remote base station to the vehicle.

8. A method according to claim 1 wherein determining an angular location vector to the target with respect to the vehicle comprises controlling a field of view of the video system from the remote base station.

9. A method according to claim 8 wherein controlling a field of view comprises:

zooming in on the target, narrowing a field of view of the video system; and adjusting a pointing azimuth and elevation angles of the video system to keep the target within the narrowing field of view.

10. A target location system for use with a vehicle, said system comprising:

a telemetry transmitter/receiver;

a radar altimeter communicatively coupled to said telemetry transmitter/receiver, said radar altimeter determining a position of the vehicle utilizing digital terrain elevation maps and providing the position of the vehicle to said telemetry transmitter/receiver; and a video system communicatively coupled to said telemetry transmitter/receiver, said video system identifying targets and providing an angular location vector of the targets to said telemetry transmitter/receiver, said target location system determining a position of the target utilizing the angular location vector, the vehicle position, and a digital terrain elevation map for a vicinity of the target.

11. A target location system according to claim 10 wherein said radar altimeter determines a position of the vehicle in terms of latitude, longitude, and elevation utilizing a digital terrain elevation map.

12. A target location system according to claim 10 wherein a position of the target is given in terms of latitude, longitude, and elevation.

13. A target location system according to claim 10 wherein said video system provides the angular location vectors for targets in vehicle body coordinates.

14. A target location system according to claim 10 comprising a remote base station communicatively coupled to said telemetry transmitter/receiver, said base station comprising a digital terrain elevation map.

15. A target location system according to claim 14 wherein said telemetry transmitter/receiver transmits the angular location vector and the position of the vehicle to said remote base station.

16. A target location system according to claim 14 wherein said remote base station transmits a target position to said telemetry transmitter/receiver.

17. A target location system according to claim 14 wherein a field of view of said video system is controlled from said remote base station.

18. A target location system according to claim 14 wherein said video system adjusts pointing azimuth angles and elevation angles to keep the target within a field of view.

* * * * *